US007780528B2

(12) United States Patent
Hirayama

(10) Patent No.: US 7,780,528 B2
(45) Date of Patent: Aug. 24, 2010

(54) RECEPTION APPARATUS, RECEPTION METHOD AND RECORDING MEDIUM

(75) Inventor: Tomoshi Hirayama, Tokyo (JP)

(73) Assignee: Sony Corporation, Tokyo (JP)

( * ) Notice: Subject to any disclaimer, the term of this patent is extended or adjusted under 35 U.S.C. 154(b) by 1574 days.

(21) Appl. No.: 09/793,562

(22) Filed: Feb. 27, 2001

(65) Prior Publication Data

US 2001/0036272 A1 Nov. 1, 2001

(30) Foreign Application Priority Data

Feb. 29, 2000 (JP) ............................ 2000-053585

(51) Int. Cl.
*A63F 9/24* (2006.01)
*A63F 13/00* (2006.01)
*G06F 17/00* (2006.01)
*G06F 19/00* (2006.01)

(52) U.S. Cl. ........................................................ 463/40

(58) Field of Classification Search ................... 463/40, 463/41; 273/430, 431
See application file for complete search history.

(56) References Cited

U.S. PATENT DOCUMENTS 4,745,468 A * 5/1988 Von Kohorn ................ 725/141
4,876,592 A 10/1989 Von Kohorn
4,905,280 A * 2/1990 Wiedemer .................... 463/40
5,073,931 A * 12/1991 Audebert et al. ............ 380/251
5,684,526 A * 11/1997 Yoshinobu .................. 725/131
5,719,619 A * 2/1998 Hattori et al. ................. 725/24
5,721,062 A * 2/1998 Kobayashi .................. 428/688
5,721,584 A * 2/1998 Yoshinobu et al. .......... 725/114
5,725,384 A * 3/1998 Ito et al. ...................... 434/350
5,759,101 A * 6/1998 Von Kohorn ................. 463/40
5,823,788 A * 10/1998 Lemelson et al. ........... 434/350
5,887,062 A * 3/1999 Maeda et al. ............... 380/234
5,903,262 A * 5/1999 Ichihashi et al. ............ 725/136
6,018,764 A * 1/2000 Field et al. .................. 709/217
6,075,527 A * 6/2000 Ichihashi et al. ............ 715/721
6,320,868 B1 * 11/2001 Okano et al. ................ 370/442
6,443,840 B2 * 9/2002 Von Kohorn ................. 463/17
6,565,437 B2 * 5/2003 Orui ............................ 463/29
6,678,890 B1 * 1/2004 Cai ............................. 725/24
7,003,115 B1 * 2/2006 Suzuki et al. ............... 380/270
2001/0021916 A1 * 9/2001 Takai .......................... 705/14
2001/0034016 A1 * 10/2001 Ziv-el et al. ................. 434/350
2002/0038383 A1 * 3/2002 Ullman et al. ............... 709/245
2002/0104007 A1 * 8/2002 Moodie et al. .............. 713/200

FOREIGN PATENT DOCUMENTS

EP 0 729 246 A1 8/1996

* cited by examiner

*Primary Examiner*—Xuan Thai
*Assistant Examiner*—Kesha Y. Frisby
(74) *Attorney, Agent, or Firm*—Oblon, Spivak, McClelland, Maier & Neustadt, L.L.P.

(57) ABSTRACT

A transmission apparatus used for transmitting a question to a recipient. Generates a control signal for limiting an answer-inputting function of a reception apparatus used by the recipient; adds the control signal generated by a generation mechanism and used for limiting the answer-inputting function of the reception apparatus and an address of a recipient reception collector unit showing a collection destination of where an answer entered by said recipient in response to the question is transmitted when an amount of recipient responses stored in a storage unit exceeds a predetermined number. The apparatus then transmits the broadcast signal including the control signal and the address of a recipient reception collector unit to the recipient.

10 Claims, 14 Drawing Sheets

2

RECEPTION APPARATUS, RECEPTION METHOD AND RECORDING MEDIUM

BACKGROUND OF THE INVENTION

In general, the present invention relates to a transmission apparatus, a transmission method, a reception apparatus, a reception method and a recording medium. More particularly, the present invention relates to a transmission apparatus, a transmission method, a reception apparatus, a reception method and a recording medium that allow a transmitting side to broadcast a question such as a quiz or a questionnaire prompting a recipient of the question on a receiving side to respond to the question and allow the receiving side to accept an answer to the question from the question recipient and to transmit the answer to the transmitting side.

In a program of a television or radio broadcast, a quiz or a questionnaire is sometimes presented to the watcher or the listener respectively. There are general methods to respond to the quiz or the questionnaire whereby an answer to the quiz or the questionnaire is usually sent by post, by phone or through the Internet.

In accordance with a method disclosed in Japanese Patent Laid-open No. Hei 1-115232, for example, answers to queries in a questionnaire are transmitted through a telephone line. The method has a shortcoming of poor operatability due to the fact that the transmission of an answer requires much labor such as finding the phone number of a station broadcasting the questionnaire and making an access to the broadcasting station.

However, a method of transmitting an answer by post, by phone or through the Internet has a problem that the responder must know information on the answer-transmission destination such as the address, the phone number or the URL (Uniform Resource Locator). In addition, there is also raised a problem that the method requires much labor such as preparing a written answer and making a phone call or making an access to a server connected to the Internet.

SUMMARY OF THE INVENTION

It is thus an object of the present invention addressing the problems described above to allow an answer to a broadcasted quiz or questionnaire to be transmitted quickly without requiring much labor.

A transmission apparatus for transmitting a question to a recipient in accordance with the present invention comprises: generation means for generating a control signal for limiting an answer-inputting function of a reception apparatus used by the recipient; first addition means for adding the control signal generated by the generation means and used for limiting the answer-inputting function of the reception apparatus and adding transmission-destination information showing a transmission destination of an answer entered by the recipient in response to the question prompting the recipient to enter the answer to a broadcast signal; and transmission means for transmitting the broadcast signal including the control signal and the transmission-destination information, which are added to the broadcast signal by the first addition means.

As the control signal for limiting the answer-inputting function of the reception apparatus, it is possible to make the generation means capable of generating an activate signal for enabling the answer-inputting function of the reception apparatus and a deactivate signal for disabling the answer-inputting function of the reception apparatus.

It is possible to further provide the transmission apparatus provided by the present invention with second addition means for adding question identification information for identifying the question prompting the recipient to enter the answer to the broadcast signal.

A transmission method for transmitting a question to a recipient in accordance with the present invention comprises: a generation step of generating a control signal for limiting an answer-inputting function of a reception apparatus used by the recipient; an addition step of adding the control signal generated at the generation step and used for limiting the answer-inputting function of the reception apparatus and adding transmission-destination information showing a transmission destination of an answer entered by the recipient in response to the question prompting the recipient to enter the answer to a broadcast signal; and a transmission step of transmitting the broadcast signal including the control signal and the transmission-destination information, which are added to the broadcast signal at the addition step.

A program recorded on a recording medium provided by the present invention and executed to transmit a question to a recipient comprises: a generation step of generating a control signal for limiting an answer-inputting function of a reception apparatus used by the recipient; an addition step of adding the control signal generated at the generation step and used for limiting the answer-inputting function of the reception apparatus and adding transmission-destination information showing a transmission destination of an answer entered by the recipient in response to the question prompting the recipient to enter the answer to a broadcast signal; and a transmission step of transmitting the broadcast signal including the control signal and the transmission-destination information, which are added to the broadcast signal at the addition step.

A reception apparatus provided by the present invention comprises: reception means for receiving a broadcasted signal; playback means for playing back the broadcasted signal received by the reception means; extraction means for extracting a control signal added to the broadcasted signal received by the reception means; accepting means for accepting an answer to a question included in a broadcast obtained as a result of a playback operation carried out by the playback means; limitation means for limiting a period of the accepting means to accept an answer to the question in accordance with the control signal extracted by the extraction means; and transmission means for transmitting the answer accepted by the accepting means in response to the question and information identifying the question to a transmission destination included in the broadcasted signal.

It is possible to make the transmission means capable of transmitting at least one of a broadcasting time and a broadcasting channel as the information identifying the question.

It is possible to make the transmission means capable of transmitting question identification information added to the broadcasted signal as the information identifying the question.

It is possible to make the transmission means capable of transmitting information identifying the reception apparatus to a transmission destination tincluded in the broadcasted signal.

It is possible to further provide the accepting means employed in the reception apparatus provided by the present invention with display means for displaying information indicating that a period of the accepting means to accept an answer has not expired.

It is possible to further provide the accepting means with increment means for incrementing the value of an answer to the question and decrement means for decrementing the value of an answer to the question.

A reception method provided by the present invention comprises: a reception step of receiving a broadcasted signal; a playback step of playing back the broadcasted signal received at the reception step; an extraction step of extracting a control signal added to the broadcasted signal received at the reception step; an accepting step of accepting an answer to a question included in a broadcast obtained as a result of a playback operation carried out at the playback step; a limitation step of limiting a period to accept an answer to the question at the accepting step in accordance with the control signal extracted at the extraction step; and a transmission step of transmitting the answer accepted at the accepting step in response to the question and information identifying the question to a transmission destination included in the broadcasted signal.

A program recorded on a recording medium provided by the present invention comprises: a reception step of receiving a broadcasted signal; a playback step of playing back the broadcasted signal received at the reception step; an extraction step of extracting a control signal added to the broadcasted signal received at the reception step; an accepting step of accepting an answer to a question included in a broadcast obtained as a result of a playback operation carried out at the playback step; a limitation step of limiting a period to accept an answer to the question at the accepting step in accordance with the control signal extracted at the extraction step; and a transmission step of transmitting the answer accepted at the accepting step in response to the question and information identifying the question to a transmission destination included in the broadcasted signal.

In accordance with the transmission apparatus and the transmission method, which are provided by the present invention, as well as the program recorded on the recording medium also provided by the present invention, a control signal is generated for limiting an answer-inputting function of a reception apparatus used by a recipient; the control signal for limiting the answer-inputting function of the reception apparatus and transmission-destination information showing a transmission destination of an answer entered by the recipient in response to the question prompting the recipient to enter the answer are added to a broadcast signal; and the broadcast signal including the control signal and the transmission-destination information is transmitted.

In accordance with the reception apparatus and the reception method, which are provided by the present invention, as well as the program recorded on the recording medium also provided by the present invention, a broadcasted signal is received; the broadcasted signal is played back; a control signal added to the broadcasted signal is extracted; an answer to a question included in a broadcast obtained as a result of the playback operation is accepted; a period to accept an answer to the question is limited in accordance with the extracted control signal; and the accepted answer responding to the question and information identifying the question are transmitted to a transmission destination included in the broadcasted signal.

DETAILED DESCRIPTION OF THE PREFERRED EMBODIMENTS

Figure 1:
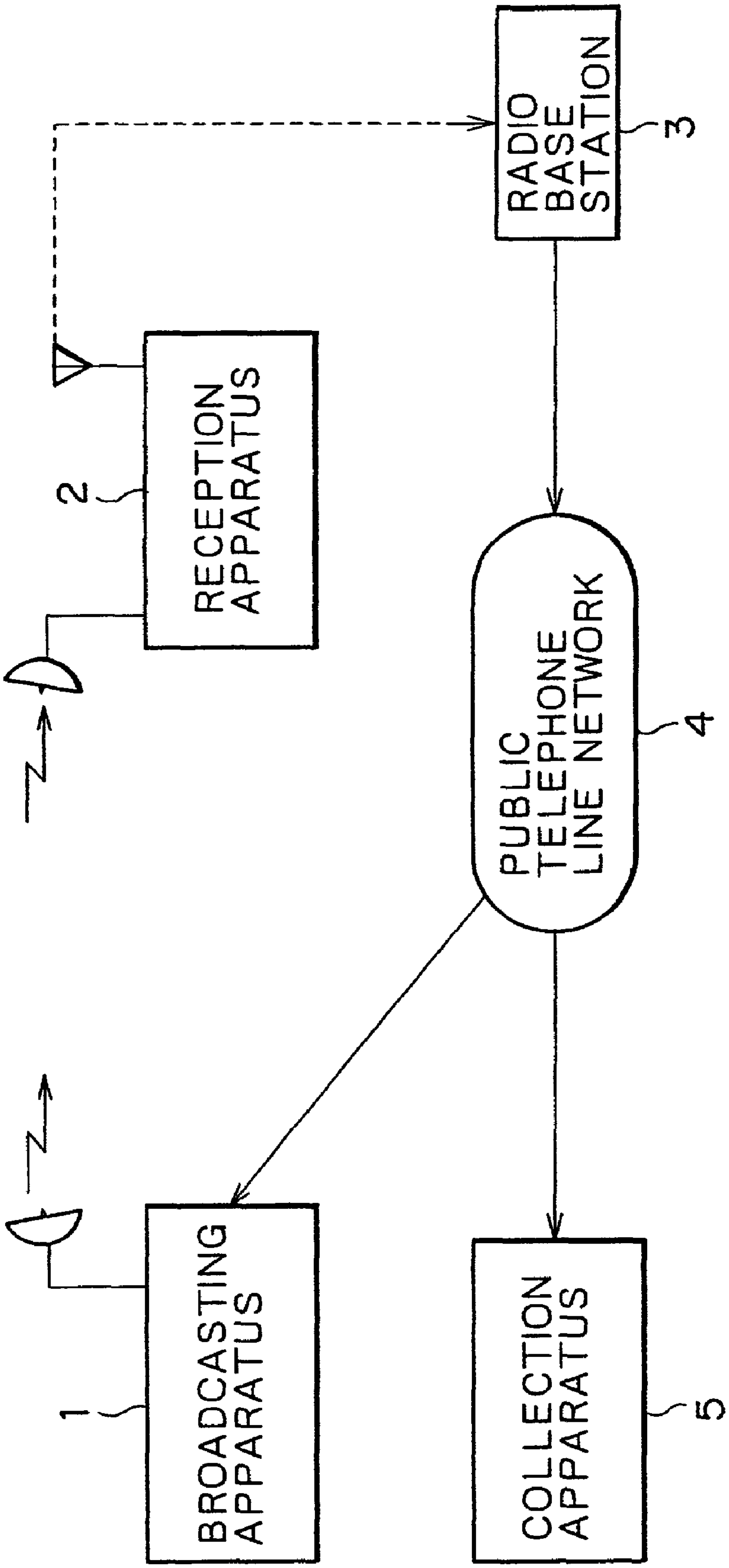
FIG. 1 is a block diagram showing a typical configuration of a broadcasting system provided by the present invention.

The following description explains a typical configuration of a broadcasting system applying the present invention to radio broadcasting by referring to FIG. 1. A broadcasting apparatus 1 shown in the figure is installed typically in a radio broadcasting station broadcasting a radio program such as disc jockey voices and music into which a quiz or a questionnaire is inserted with a proper timing. It should be noted that the quiz or the questionnaire broadcasted along with a radio program can be answered by using a number.

A broadcast signal transmitted by the broadcasting apparatus 1 includes an embedded activate signal in addition to an audio signal of a radio program. As will be described later, the activate signal is a signal for controlling a reception apparatus 2. The broadcasting apparatus 1 also encrypts content data for sales to listeners and transmits the encrypted data by multiplexing the data with the broadcast signal. In addition, the broadcasting apparatus 1 transmits a decryption key to specific reception apparatus 2 by multiplexing the decryption key with the broadcast signal. The decryption key is used for decrypting the encrypted content data.

It should be noted that the content data for sales to listeners include images, sounds and games. The content data may also include a program for controlling the reception apparatus 2.

The listener to a radio program operates the reception apparatus 2 to receive a broadcast signal transmitted by the broadcasting apparatus 1 and to play back sounds and voices from the received broadcast signal. The reception apparatus 2 also accepts an answer entered by the listener in response to a quiz or a questionnaire properly inserted into a broadcasted radio program, and stores the answer. The reception apparatus 2 then transmits the stored answer to a collection apparatus 5 by way of a radio base station 3 and a public telephone line network 4.

The collection apparatus 5 collects as well as analyzes an answer transmitted by the reception apparatus 2 by way of the radio base station 3 and the public telephone line network 4 in response to a quiz or a questionnaire, storing results of analyses. It should be noted that a plurality of different collection apparatuses 5 can be provided for different quizzes and questionnaires.

Figure 2:
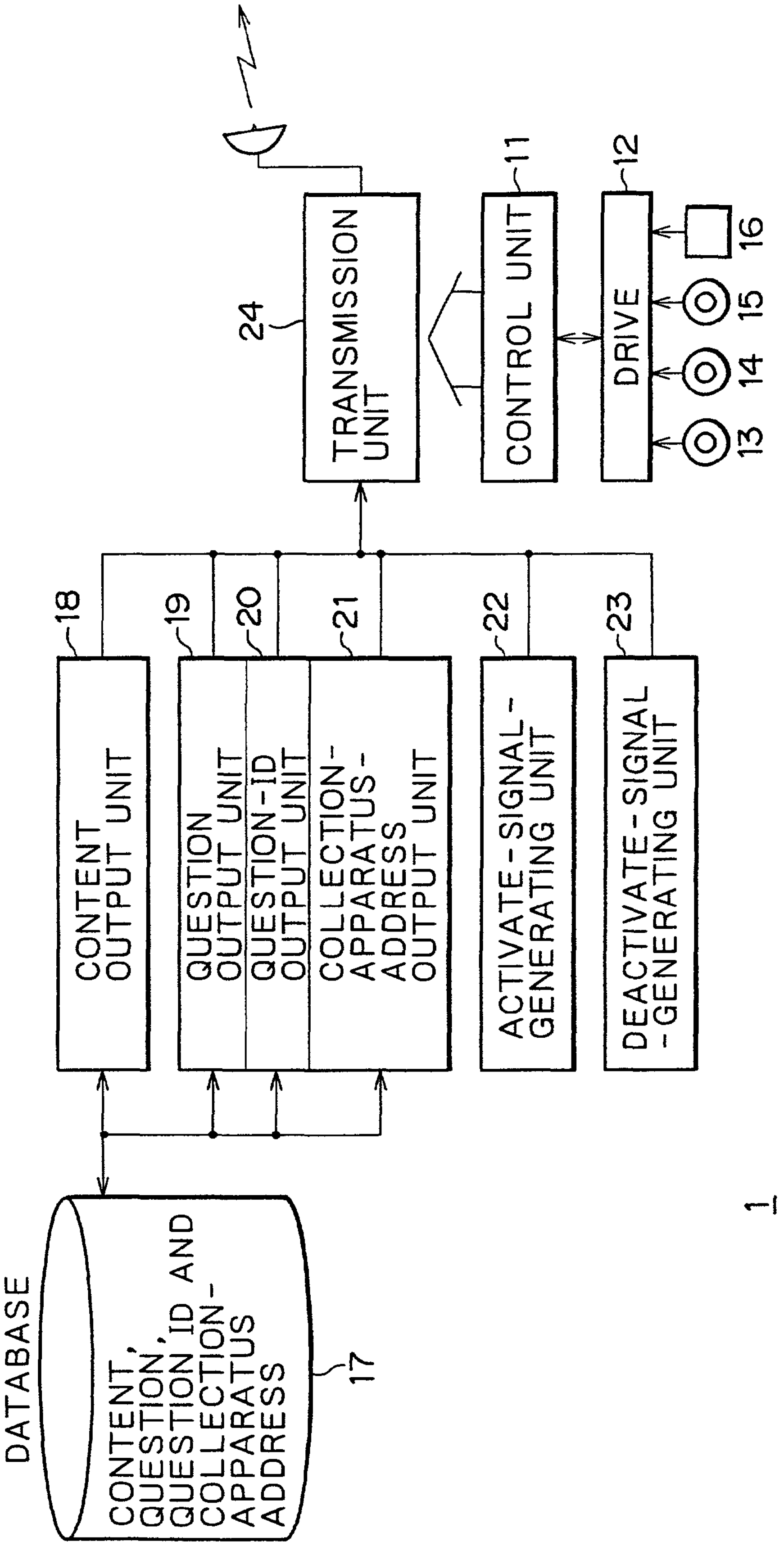
FIG. 2 is a block diagram showing a typical configuration of a broadcasting apparatus employed in the broadcasting system shown in FIG. 1.

FIG. 2 is a diagram showing a typical configuration of the broadcasting apparatus 1. A control unit 11 employed in the broadcasting apparatus 1 controls a drive 12 to read out a control program from a magnetic disc 13, an optical disc 14, a magneto-optical disc 15 or a semiconductor memory 16. The control unit 11 then controls other components employed in the broadcasting apparatus 1 on the basis of the control program read out by the drive 12 and operation inputs entered by the user.

A database 17 is used for storing data such as disc-jockey voices and music, which serve as materials of a radio program, as well as voices reading quizzes and questionnaires. The database 17 is also used for storing information for identifying quizzes and questionnaires. In the following description, a quiz or a questionnaire is referred to simply as a question whereas information for identifying a quiz and a questionnaire is referred to as a question ID. A question ID for identifying a question is stored in the database 17, being associated with the question also stored in the database 17. In addition, for each question, the database 17 contains the address of a collection apparatus 5 (for example, phone number for making an access to the collection apparatus 5) for collecting answers to the question. Furthermore, the database 17 is also used for storing content data for sales.

Controlled by the control unit 11, a content output unit 18 reads out materials of a radio program other than a question, and content data for sales, to be transmitted as a broadcast signal from the database 17 and supplies the materials to a transmission unit 24. The content output unit 18 also receives materials of a radio program other than a question entered via a microphone not shown in the figure in a real-time manner and supplies the materials to the transmission unit 24. Examples of such materials are disc-jockey voices and music.

Controlled by the control unit 11, a question output unit 19 reads out a question to be inserted into a radio program from the database 17 and supplies the question to the transmission unit 24. The question output unit 19 also receives a question entered via the microphone in a real-time manner and supplies the question to the transmission unit 24.

Controlled by the control unit 11, a question-ID output unit 20 reads out a question ID identifying a question read out by the question output unit 19 from the database 17 and supplies the question ID to the transmission unit 24.

Controlled by the control unit 11, a collection-apparatus-address output unit 21 reads out the address of collection apparatus 5 for collecting answers to a question read out by the question output unit 19 from the database 17 and supplies the address to the transmission unit 24.

Controlled by the control unit 11, an activate-signal-generating unit 22 generates an activate signal and supplies the signal to the transmission unit 24.

Figure 3:
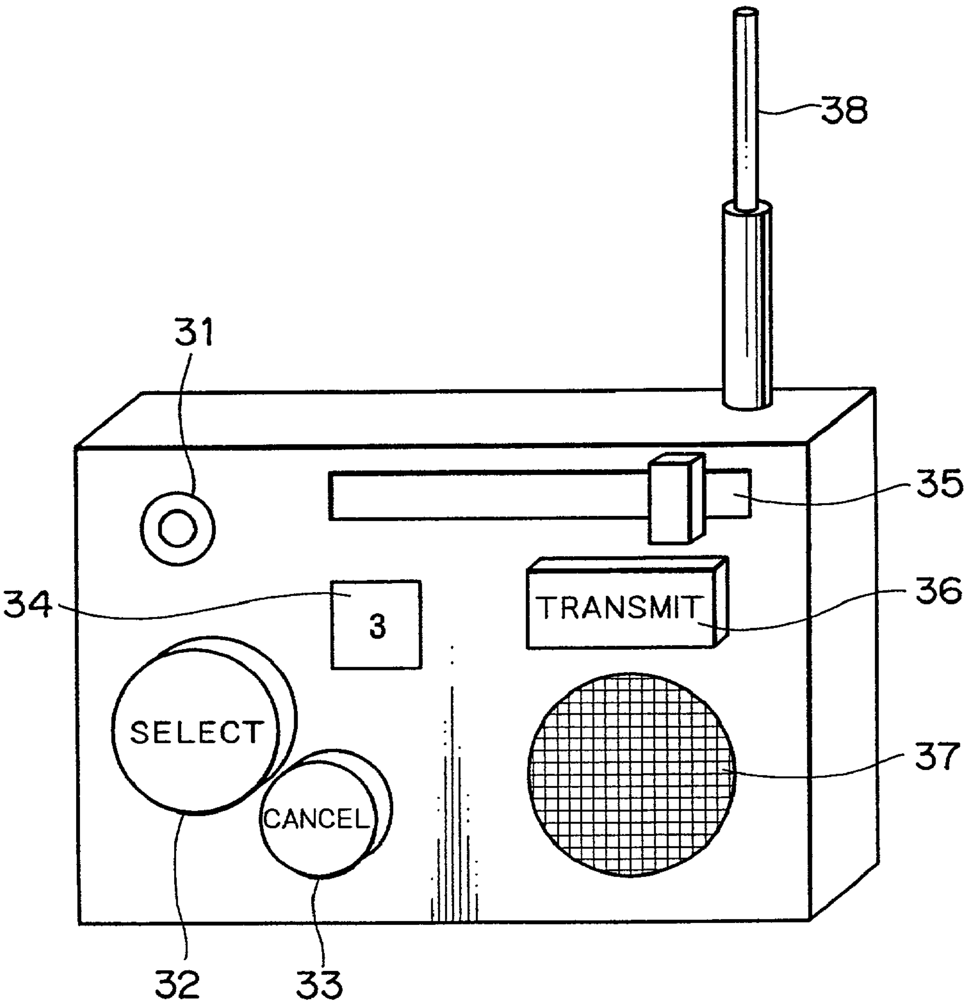
FIG. 3 is a diagram showing an external view of a typical configuration of a reception apparatus employed in the broadcasting system shown in FIG. 1.

Controlled by the control unit 11, a deactivate-signal-generating unit 23 generates a deactivate signal and supplies the signal to the transmission unit 24. The activate signal is a signal transmitted to the reception apparatus 2 to show a timing, with which a select button 32 of the reception apparatus 2 shown in FIG. 3 is put in an enabled-operation state. On the other hand, the deactivate signal is a signal transmitted to the reception apparatus 2 to show a timing, with which the select button 32 of the reception apparatus 2 is put in a disabled-operation state.

Controlled by the control unit 11, the transmission unit 24 includes the materials other than a question of a radio program received from the content output unit 18 or a question received from the question output unit 19 in a broadcast signal and transmits the broadcast signal including the material and the question as an audio signal of the radio program. The transmission unit 24 also has the question ID received from the question-ID output unit 20, the address of the collection apparatus 5 received from the collection-apparatus-address output unit 21, the activate signal received from the activate-signal-generating unit 22 or the deactivate signal from the deactivate-signal-generating unit 23 embedded in the broadcast signal in a signal format like a watermark prior to transmission of the broadcast signal.

In addition, the transmission unit 24 encrypts content data received from the content output unit 18 for sales and multiplexes the encrypted content data with the broadcast signal before transmitting the broadcast signal in accordance with control executed by the control unit 11. Furthermore, the transmission unit 24 also encrypts a decryption key for decrypting the encrypted content data by using the reception-apparatus ID of a reception apparatus 2 serving as a transmission destination and multiplexes the encrypted decryption key prior to the transmission of the broadcast signal in accordance with control executed by the control unit 11.

Moreover, the broadcasting apparatus 1 includes a reception unit for receiving a purchase application signal applying for a purchase of a decryption key from a reception apparatus 2. Composed of a content ID and a reception-apparatus ID, the purchase application signal is transmitted by the reception apparatus 2 to the broadcasting apparatus 1 by way of the public telephone line network 4. The reception unit itself is shown in none of the figures. The purchase application signal applying for a purchase of a decryption key is supplied to the control unit 11.

Figure 4:
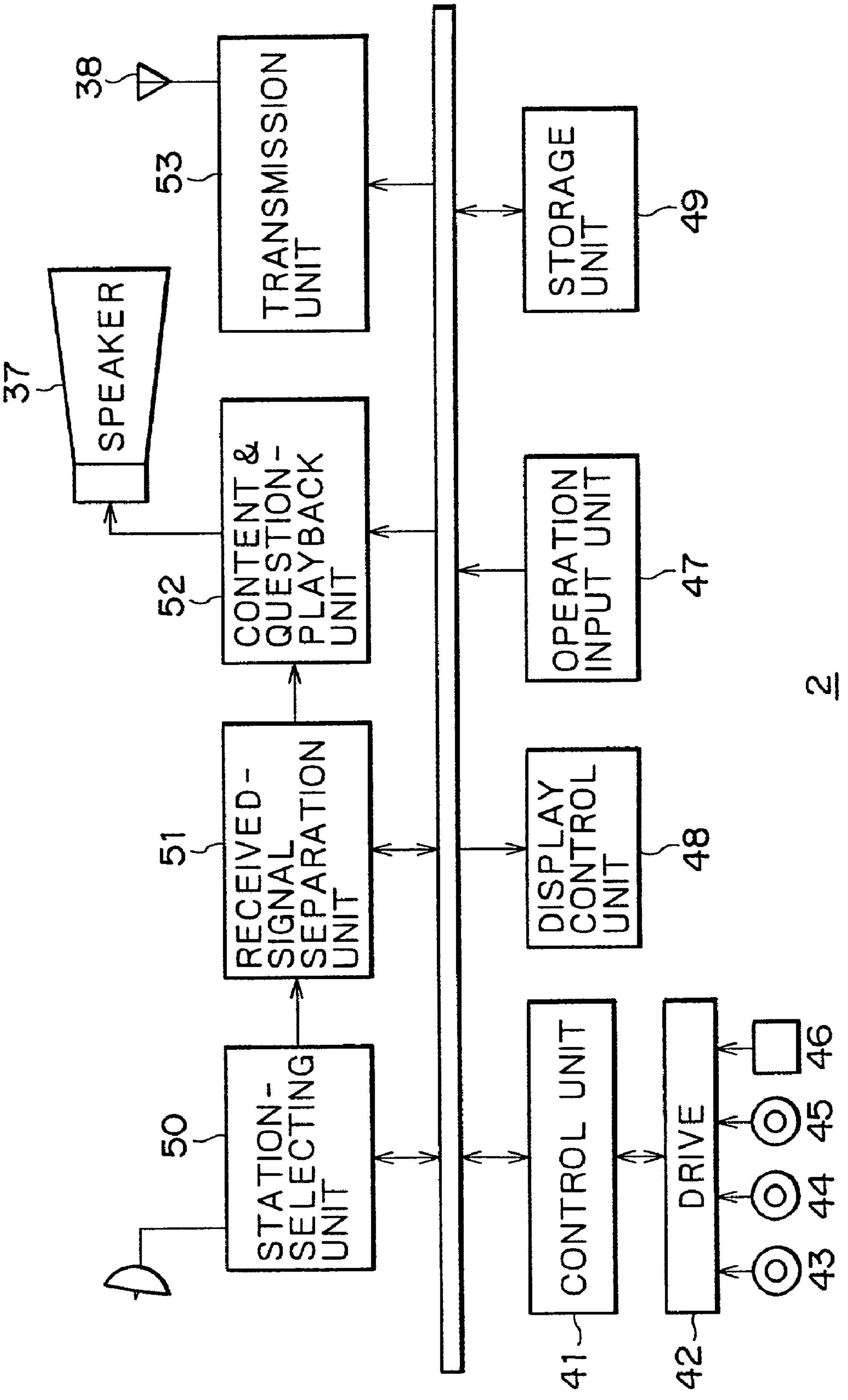
FIG. 4 is a block diagram showing a typical configuration of the reception apparatus.

Next, a typical configuration of the reception apparatus 2 is explained by referring to FIGS. 3 and 4.

FIG. 3 is a diagram showing an external view of a typical configuration of the reception apparatus 2. An active indicator 31 is turned on when a select button 32 and a cancel button 33 are put in an operatable state by an activate signal received from the broadcasting apparatus 1. On the other hand, the active indicator 31 is turned off when the select button 32 and the cancel button 33 are put in an unoperatable state by deactivate signal received from the broadcasting apparatus 1.

The select button 32 is used by the user (the content recipient) to enter an answer to a broadcasted question. To be more specific, a number entered as an answer is incremented by 1 each time the select button 32 is pressed. The number of times the select button 32 was pressed so far is displayed on a select-count display window 34. The value of an answer entered by pressing the select button 32, that is, a value displayed on the select-count display window 34, is decremented by 1 each time the cancel button 33 is pressed.

In order to enter the number 3 as an answer to a question, for example, the user needs to press the select button 32 three times. If the user presses the select button 32 four times by mistake, for example, the user needs to press the cancel button 33 once. At that time, the select-count display window 34 once displays the number 4 and eventually displays a final answer of 3 (=4−1).

It should be noted that an answer to a question displayed on the select-count display window 34 is stored in a storage unit 49 shown in FIG. 4, being associated with the question ID of the question.

If a content-data sale service is rendered through radio broadcasting, for example, the select button 32 is also pressed to make a request for downloading or recording of content data. The content-data sale service is a service to sell compressed and encoded data of music broadcasted as an audio signal by multiplexing the data in a broadcasted signal. The compressed and encoded data is obtained as a result of encryption. In this case, if the cancel button 33 is pressed, the request for downloading or recording of content data is canceled.

A content ID identifying content data downloaded by an operation to press the select button 32 is stored in the storage unit 49 shown in FIG. 4 much like an answer to a question and other data. The content ID is embedded in the broadcasted signal.

A tuning slide 35 is operated to select a radio broadcasting station, a broadcast of which is to be received.

A transmit button 36 is pressed to set the reception apparatus 2 in an answer-data-transmission mode. To put it concretely, the transmit button 36 is pressed to transmit a question ID stored in the storage unit 49 and data such as an answer associated with the question ID to the collection apparatus 5. The transmit button 36 is also pressed to indicate a desire to purchase a decryption key of downloaded encrypted content data. That is to say, the transmit button 36 is pressed to make a request for a transfer of the decryption key.

A speaker 37 outputs voices and sounds of a radio program. An antenna 38 transmits a radio signal conveying a question ID stored in the storage unit 49 and data such as an answer associated with the question ID.

FIG. 4 is a diagram showing a typical electrical configuration of the reception apparatus 2. A control unit 41 employed in the reception apparatus 2 controls a drive 42 to read out a control program from a magnetic disc 43, an optical disc 44, a magneto-optical disc 45 or a semiconductor memory 46. The control unit 41 also controls other components composing the reception apparatus 2 on the basis of operation information entered by the user via an operation input unit 47 by execution of the control program read out by the drive 42.

When an activate signal is received by a received-signal separation unit 51, for example, the control unit 41 controls a display control unit 48 to turn on the active indicator 31 and controls an operation input unit 47 to detect an operation to press the select button 32 or the cancel button 33. When a deactivate signal is received by the received-signal separation unit 51, on the other hand, the control unit 41 controls the display control unit 48 to turn off the active indicator 31 and controls the operation input unit 47 to ignore an operation to press the select button 32 or the cancel button 33.

The operation input unit 47 detects an operation carried out by the user on the select button 32, the cancel button 33, the tuning slide 35 or the transmit button 36 and outputs information on the operation to the control unit 41. Controlled by the control unit 41, the display control unit 48 controls operations to turn on or off the active indicator 31 and to display information on the select-count display window 34.

The storage unit 49 is used for storing the address of a collection apparatus 5, a question ID and an answer supplied thereto by operating the select button 32 and the cancel button 33 as a set. The storage unit 49 is also used for storing a unique reception-apparatus ID assigned to the reception apparatus 2. It should be noted that the reception-apparatus ID is not only used for identifying the reception apparatus 2, but also used by a supervisory person for identifying the user through management executed by associating the reception-apparatus ID and the profile of the user. In addition, the storage unit 49 is also used for storing downloaded content data, that is, compressed and encoded data of music and the like. It should be noted that the storage unit 49 can be integrated with the magnetic disc 43, the optical disc 44, the magneto-optical disc 45 or the semiconductor memory 46 into a single unit.

Controlled by the control unit 41, a station-selecting unit 50 receives a signal broadcasted by a radio broadcasting station selected by the user by operating the tuning slide 35 and supplies the signal to a received-signal separation unit 51. Also controlled by the control unit 41, the received-signal separation unit 51 separates an audio signal from the broadcasted signal and outputs the audio signal to a content & question playback unit 52. The received-signal separation unit 51 also separates signals other than the audio signal and content data from the broadcasted signal and supplies the other signals to the control unit 41. The other signals include a question ID, the address of a collection apparatus 5 to receive an answer from the user, an activate or deactivate signal and a decryption key. In addition, the received-signal separation unit 51 separates the content data from the broadcasted signal and supplies the content data to the storage unit 49.

The content & question playback unit 52 plays back an audio signal received from the received-signal separation unit 51 and outputs a signal obtained as a result of the playback operation to the speaker 37. In addition, the content & question playback unit 52 also decodes encrypted content data read out from the storage unit 49 by using a decryption key received from the control unit 41, plays back a result of decoding and outputs a signal obtained as a result of the playback operation to the speaker 37. The encrypted content data read out from the storage unit 49 is compressed and encoded data of music or the like.

A transmission unit 53 has a function equivalent to the data-communication function of a mobile phone or a PHS (Personal Handyphone System). Controlled by the control unit 41, the transmission unit 53 reads out a set comprising the address of a collection apparatus 5, a question ID and an answer from the storage unit 49, properly adds the reception-apparatus ID to the answer and the question ID, and transmits the answer, the question ID and the reception-apparatus ID to the address of the collection apparatus 5 as a radio signal. In addition, also on the basis of control executed by the control unit 41, the transmission unit 53 transmits information applying for a purchase of a decryption key for decoding content data stored in the storage unit 49 to the broadcasting apparatus 1 as a radio signal. In actuality, the information comprises a content ID and a reception-apparatus ID.

Figure 5:
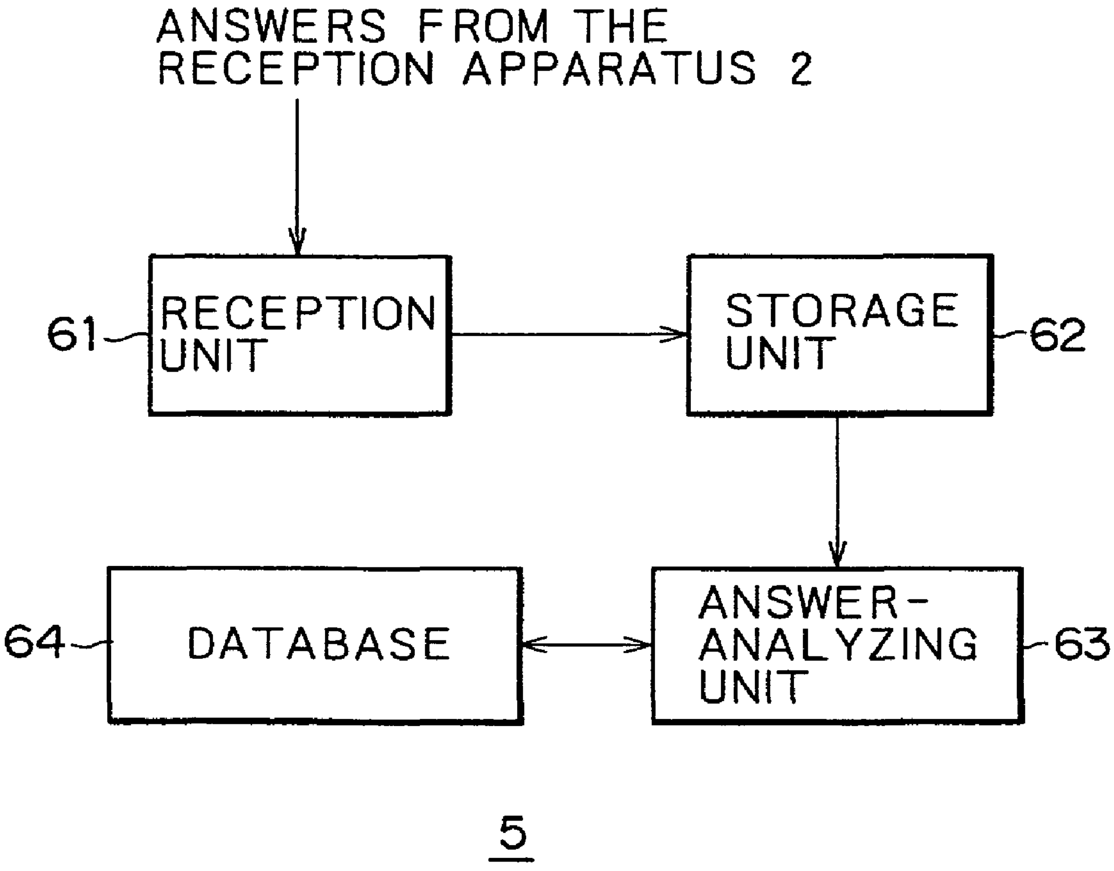
FIG. 5 is a block diagram showing a typical configuration of a collection apparatus employed in the broadcasting system shown in FIG. 1.

FIG. 5 is a diagram showing a typical configuration of the collection apparatus 5. A reception unit 61 employed in the collection apparatus 5 receives typically an answer to a question from a reception apparatus 2 through the public telephone line network 4 and stores the answer in a storage unit 62. An answer-analyzing unit 63 reads out an answer to a question from the storage unit 62, analyzes the answer and stores a result of the analysis in a database 64.

Figure 6:
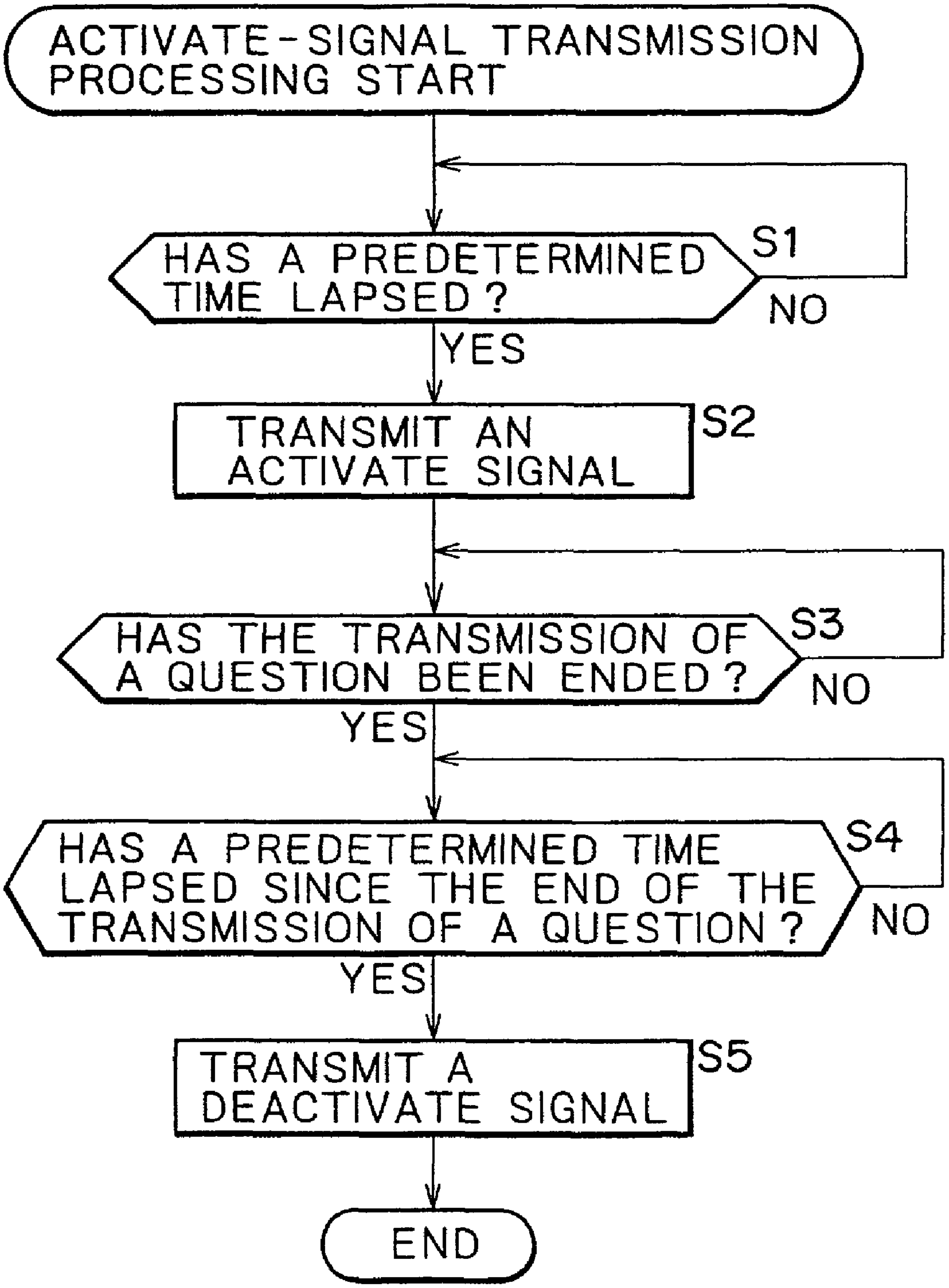
FIG. 6 is a flowchart used for explaining processing carried out by the broadcasting apparatus to transmit an activate signal.
Figure 7:
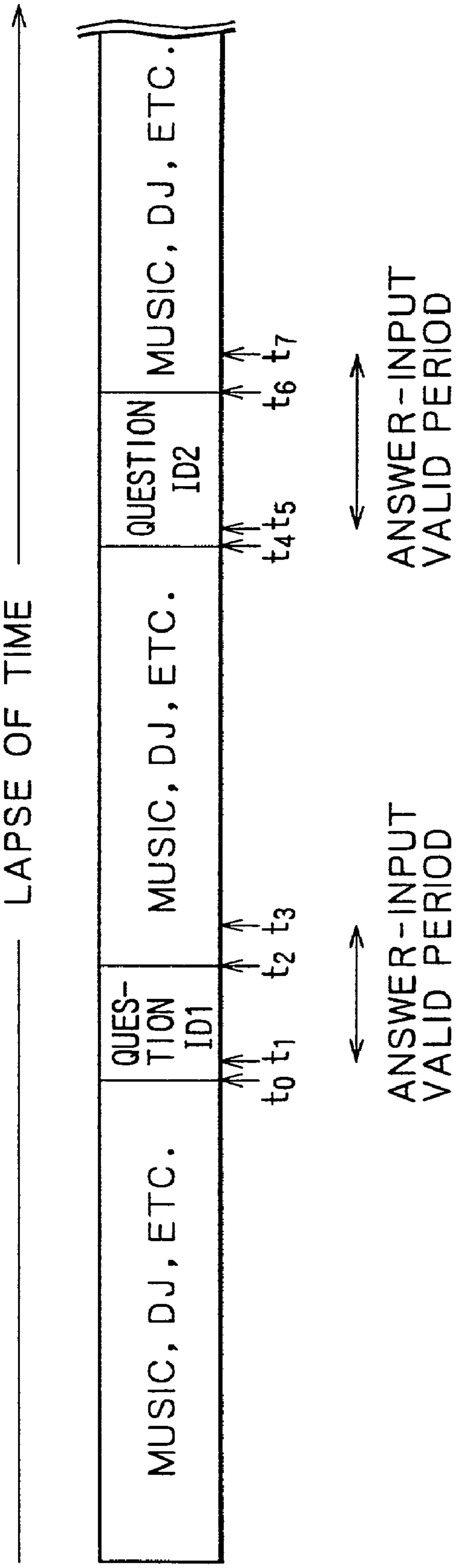
FIG. 7 is a diagram showing timings of the activate signal and a deactivate signal.

Next, processing carried out by the broadcasting apparatus 1 to transmit activate signals is explained by referring to a flowchart shown in FIG. 6 and a timing diagram shown in FIG. 7. The broadcasting apparatus 1 carries out broadcasting in accordance with a schedule determined in advance. To put it concretely, music and disc-jockey voices read out by the content output unit 18 or the question output unit 19 from the database 17, voices reading a quiz or a questionnaire and other broadcasts are transmitted from the transmission unit 24 as an audio signal of a broadcast signal. When a question is transmitted, the question ID of the question and the address of an collection apparatus 5 for collecting answers to the question are included in the broadcast signal.

The processing to transmit activate signals is started when a transmission of a question as an audio signal of a radio broadcast is commenced. For example, the processing is started at a time to start a transmission of a question (or a question IDI shown in FIG. 7).

The flowchart shown in FIG. 6 begins with a step S1 at which the control unit 11 forms a judgment as to whether or not a predetermined time has lapsed since the start of a transmission of a question. The control unit 11 is in a wait state, forming the judgment repeatedly till the outcome of the judgment indicates that the predetermined time has lapsed. As the outcome of the judgment indicates that the predetermined time has lapsed, that is, at a time $t_1$ shown in FIG. 7, the flow of the processing goes on to a step S2.

At the step S2, the activate-signal-generating unit 22 generates an activate signal and outputs the signal to the transmission unit 24 in accordance with control executed by the control unit 11. The transmission unit 24 includes the activate signal received from the activate-signal-generating unit 22 in a broadcast signal and transmits the broadcast signal.

At the next step S3, the control unit 11 forms a judgment as to whether or not the transmission of a question has been completed. The control unit 11 is in a wait state, forming the judgment repeatedly till the outcome of the judgment indicates that the transmission of a question has been completed. As the outcome of the judgment indicates that the transmission of a question has been completed, that is, at a time $t_2$ shown in FIG. 7, the flow of the processing goes on to a step S4.

At the step S4, the control unit 11 forms a judgment as to whether or not a predetermined time has lapsed since the end of the transmission of a question. The control unit 11 is in a wait state, forming the judgment repeatedly till the outcome of the judgment indicates that the predetermined time has lapsed. As the outcome of the judgment indicates that the predetermined time has lapsed, that is, at a time $t_3$ shown in FIG. 7, the flow of the processing goes on to a step S5.

At the step S5, the deactivate-signal-generating unit 23 generates a deactivate signal and outputs the signal to the transmission unit 24 in accordance with control executed by the control unit 11. The transmission unit 24 includes the deactivate signal received from the deactivate-signal-generating unit 23 in a broadcast signal and transmits the broadcast signal.

By carrying out processing to transmit activate and deactivate signals as described above, it is possible to set a period during which an answer to a question can be entered to a reception apparatus 2 each time an answer is transmitted. In the example shown in FIG. 7, for example, a period between times $t_1$ and $t_3$ is a period during which an answer to a question identified by a question identification ID1 can be entered to a reception apparatus 2. On the other hand, a period between times $t_5$ and $t_7$ is a period during which an answer to a question identified by a question identification ID2 can be entered to the reception apparatus 2.

Figure 8:
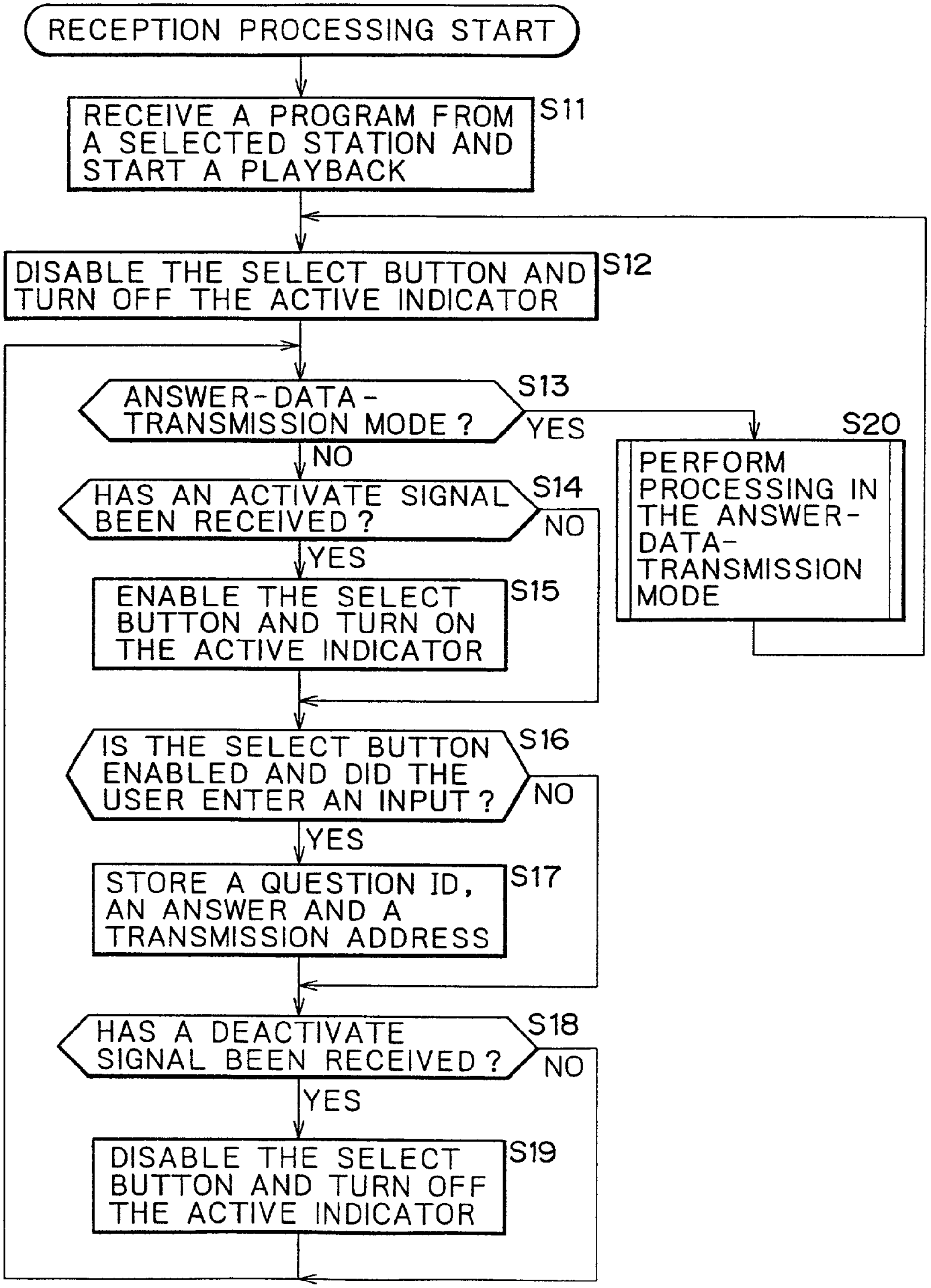
FIG. 8 is a flowchart used for explaining reception processing carried out by the reception apparatus.

Next, reception processing carried out by the reception apparatus 2 is explained by referring to a flowchart shown in FIG. 8. The reception processing is started when the power supply of the reception apparatus 2 is turned on.

The flowchart shown in FIG. 8 begins with a step Sll at which the station-selecting unit 50 employed in the reception apparatus 2 receives a broadcasted signal from a radio broadcasting station 1 selected by operating the tuning slide 35 and outputs the signal to a component at the following stage. As a result, voices and sounds of the selected radio broadcasting station 1 are output from the speaker 37.

At the next step S12, the control unit 41 controls the operation input unit 47 so as to ignore operations carried out by the user on the select button 32 and the cancel button 33. The control unit 41 also controls the display control unit 48 to turn off the active indicator 31. As a result, the select button 32 and the cancel button 33 are each put effectively in a state of being disabled to generate input signals and the active indicator 31 is turned off. The active indicator 31 is normally put in an off state. So, in this case, the off state is sustained.

At the next step S13, the control unit 41 forms a judgment as to whether or not the transmit button 36 has been pressed to set the answer-data-transmission mode. If the outcome of the judgment indicates that the answer-data-transmission mode has not been set, the flow of the reception processing goes on to a step S14.

At the next step S14, the control unit 41 forms a judgment as to whether or not an activate signal has been received. If the outcome of the judgment indicates that an activate signal has been received, the flow of the reception processing goes on to a step S15. At the step S15, the control unit 41 controls the operation input unit 47 so as to detect operations carried out by the user on the select button 32 and the cancel button 33 and also controls the display control unit 48 to turn on the active indicator 31. As a result, the select button 32 and the cancel button 33 are each put effectively in a state of being enabled to generate input signals and the active indicator 31 is turned on.

It should be noted that, if the outcome of the judgment formed at the step S14 indicates that an activate signal has not been received, on the other hand, the processing of the step S15 is skipped.

At the next step S16, the control unit 41 forms a judgment as to whether or not the select button 32 and the cancel button 33 are each put effectively in a state of being enabled to generate input signals and an answer to a question has been entered by operating the select button 32 and the cancel button 33. If the outcome of the judgment indicates that the select button 32 and the cancel button 33 are each put effectively in a state of being enabled to generate input signals and an answer to a question has been entered by operating the select button 32 and the cancel button 33, the flow of the reception processing goes on to a step S17.

At the next step S17, the control unit 41 stores an answer entered by operating the select button 32 and the cancel button 33 in response to a question, a question ID and the address of a destination to which the answer is to be transmitted in the storage unit 49. The destination is the collection apparatus 5. In the following description, the answer, the question ID and the address of the collection apparatus 5 are collectively referred to as answer data.

It should be noted that, if the outcome of the judgment formed at the step S16 indicates that the select button 32 and the cancel button 33 have not each been put effectively in a state of being enabled to generate input signals or an answer to a question has not been entered by operating the select button 32 and the cancel button 33, on the other hand, the processing of the step S17 is skipped.

At the next step S18, the control unit 41 forms a judgment as to whether or not a deactivate signal has been received. If the outcome of the judgment indicates that a deactivate signal has been received, the flow of the reception processing goes on to a step S19. At the step S19, the control unit 41 controls the operation input unit 47 so as to ignore operations carried out by the user on the select button 32 and the cancel button 33. The control unit 41 also controls the display control unit 48 to turn off the active indicator 31. As a result, the select button 32 and the cancel button 33 are each put effectively in a state of being disabled to generate input signals and the active indicator 31 is turned off.

Then, the flow of the reception processing goes back to the step S13 to carry out the processing repeatedly till the power supply of the reception apparatus 2 is turned off.

It should be noted that, if the outcome of the judgment formed at the step S18 indicates that a deactivate signal has not been received, on the other hand, the flow of the reception processing goes back directly to the step S13, skipping the processing of the step S19. Then, the processing is carried out repeatedly till the power supply of the reception apparatus 2 is turned off.

By the way, if the outcome of the judgment formed at the step S13 indicates that the answer-data-transmission mode has been set, on the other hand, the flow of the reception processing goes on to a step S20.

At the step S20, the control unit 41 carries out processing in the answer-data-transmission mode. The processing in the answer-data-transmission mode is explained by referring to a flowchart shown in FIG. 9.

Figure 9:
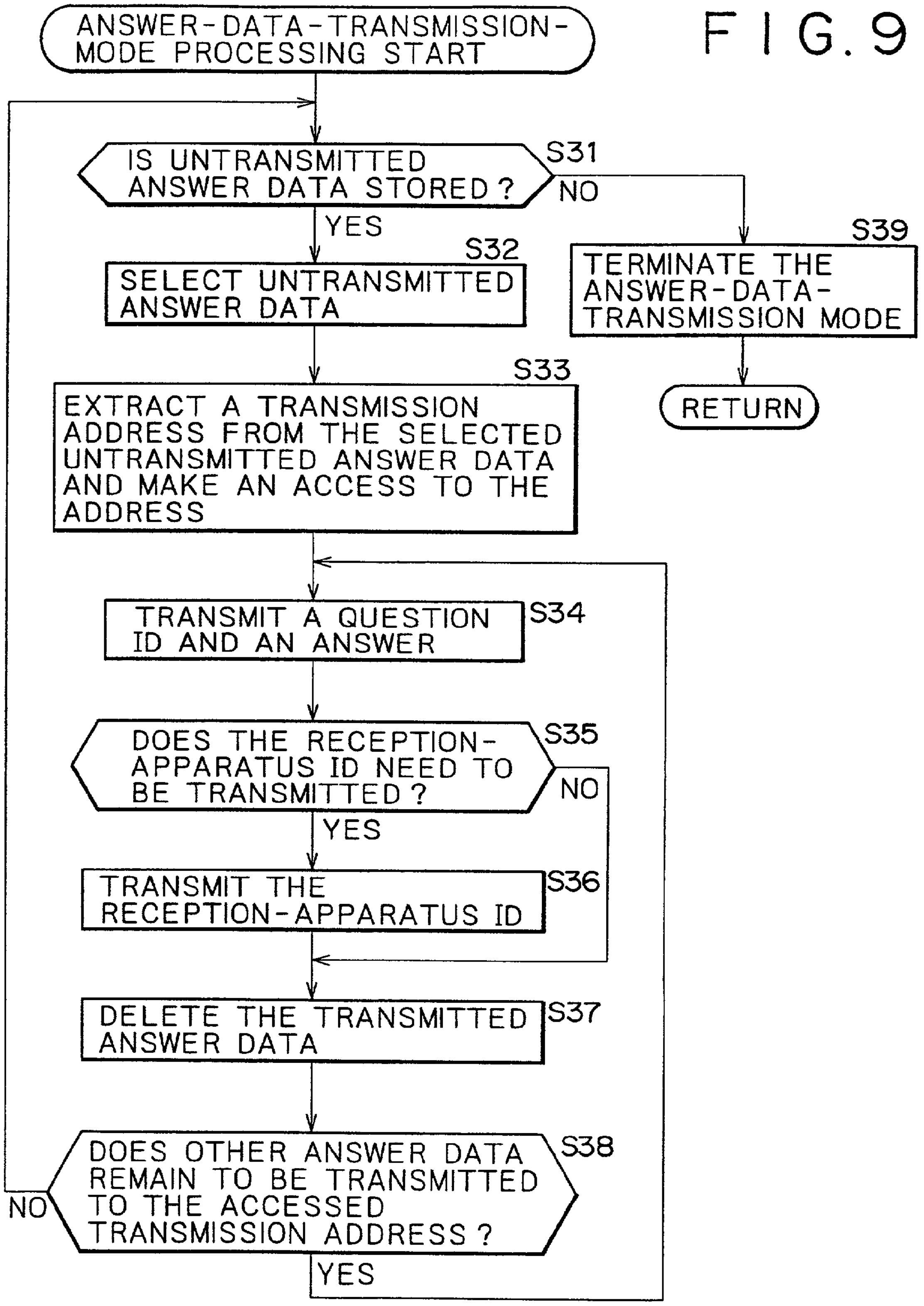
FIG. 9 is a flowchart used for explaining processing carried out in an answer-data-transmission mode at a step S20 of a flowchart shown in FIG. 8.

The flowchart shown in FIG. 9 begins with a step S31 at which the control unit 41 forms a judgment as to whether or not the answer data to be transmitted to the collection apparatus 5 is stored in the storage unit 49. If the outcome of the judgment indicates that the answer data to be transmitted to the collection apparatus 5 is stored in the storage unit 49, the flow of the processing in the answer-data-transmission mode goes on to a step S32.

At the step S32, the control unit 41 selects a piece of answer data stored in the storage unit 49 and reads out the selected piece of answer data from the storage unit 49. At the next step S33, the control unit extracts the address of the collection apparatus 5 serving as a destination from the piece of answer data read out from the storage unit 49. Controlled by the control unit 41, the transmission unit 53 makes an access to the destination by dialing in order to establish a communication.

At the next step S34, controlled by the control unit 41, the transmission unit 53 transmits answer data and an answer ID included in the answer data to the collection apparatus 5 accessed at the step S33.

At the next step S35, the control unit 41 forms a judgment as to whether or not a reception-apparatus ID is to be added to the answer and the answer ID, which were transmitted at the step S34, and to be transmitted too. If the outcome of the judgment indicates that a reception-apparatus ID is to be added and to be transmitted as well, the flow of the processing in the answer-data-transmission mode goes on to a step S36. It should be noted that, as a condition for determining that a reception-apparatus ID is to be added and to be transmitted in this judgment, the collection apparatus 5 desires such a reception-apparatus ID and the user of the reception apparatus 2 consents to transmission of the reception-apparatus ID. The existence or non-existence of the collection apparatus' desire for a reception-apparatus ID is indicated by information embedded in the broadcasted signal.

At the step S36, controlled by the control unit 41, the transmission unit 53 transmits the reception-apparatus ID to the collection apparatus 5 accessed at the step S33. It should be noted that, if the outcome of the judgment formed at the step S35 indicates that a reception-apparatus ID is not to be added and to be transmitted, on the other hand, the processing of the step S36 is skipped.

At the next step S37, controlled by the control unit 41, the storage unit 49 deletes the piece of answer-data transmitted at the step S34. At the next step S38, the control unit 41 forms a judgment as to whether or not the storage unit 49 still includes another piece of answer data to be transmitted to the destination accessed at the step S33 to establish a communication therewith. If the outcome of the judgment indicates that such a piece of answer data remains in the storage unit 49 to be transmitted to the destination with an established communication, the flow of the processing in the answer-data-transmission mode goes back to the step S34 to repeat the processing starting with the step S34.

If the outcome of the judgment formed at the step S38 indicates that no more piece of answer data remains in the storage unit 49 to be transmitted to the destination with an established communication, on the other hand, the communication established at the step S33 is terminated. Then, the flow of the processing in the answer-data-transmission mode goes back to the step S31 to repeat the processing starting with the step S31.

If the outcome of the judgment formed at the step S31 indicates that no answer data to be transmitted to the collection apparatus 5 is stored in the storage unit 49, on the other hand, the flow of the processing in the answer-data-transmission mode goes on to a step S39. At the step S39, the control unit 41 releases the reception apparatus 2 from the answer-data-transmission mode. The flow of the processing then goes back to the step S12 of the flowchart shown in FIG. 8.

By virtue of the reception processing carried out by the reception apparatus 2 as described above, the user is capable of transmitting an answer to the collection apparatus 5 automatically by merely pressing the transmit button 36 without performing processing to write words or to make a phone call.

In the reception processing described above, in the answer-data-transmission mode set by pressing the transmit button 36, answer data is transmitted. It should be noted, however, that answer data can also be transmitted periodically such as every month-end or every weekend. As an alternative, a piece of answer data is transmitted only when the answer-data count of answer data stored in the storage unit 49 exceeds a predetermined number.

Figure 10:
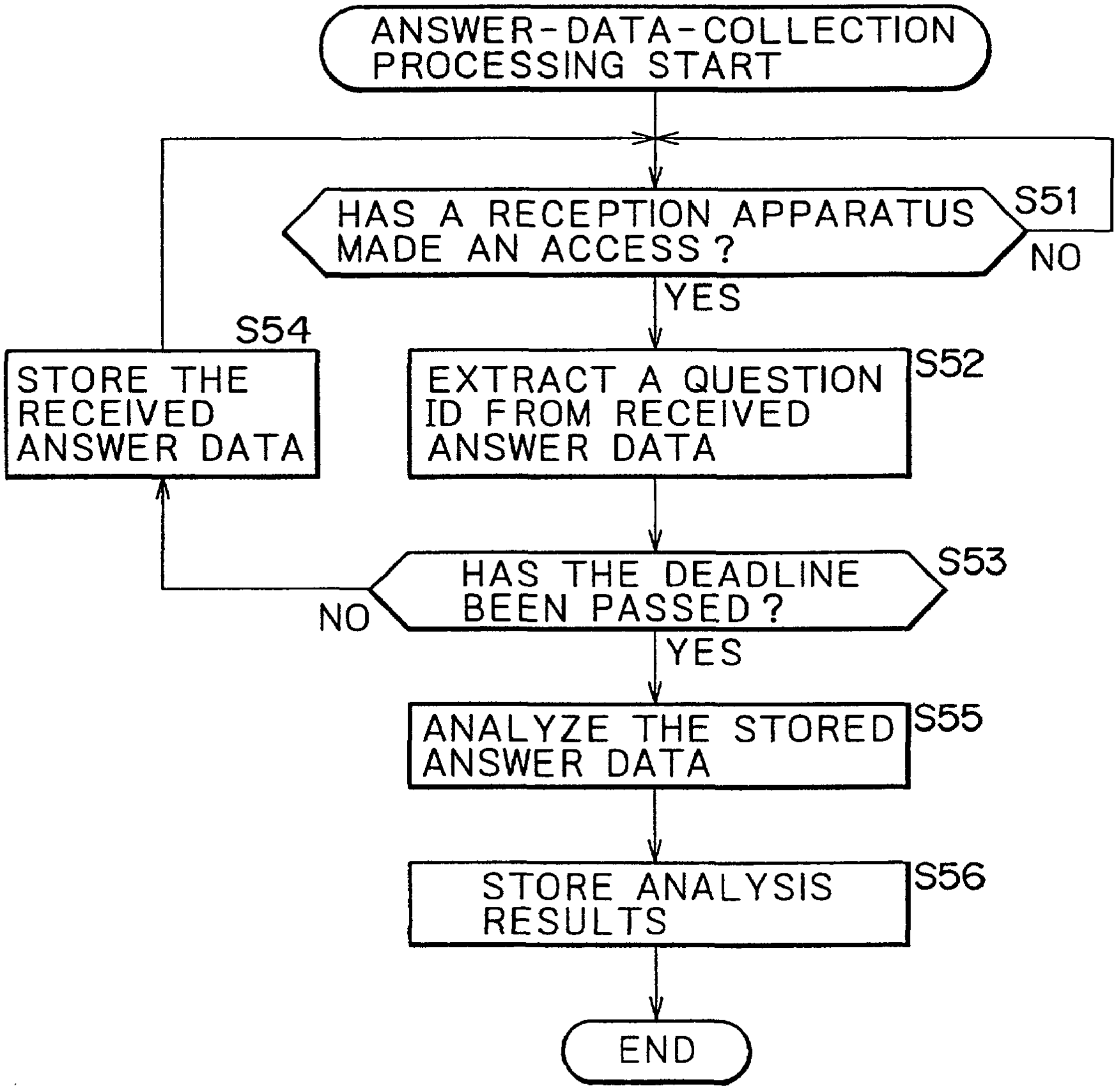
FIG. 10 is a flowchart used for explaining processing carried out by the collection apparatus shown in FIG. 5 to collect answer data.

The following description explains processing carried out by the collection apparatus 5 to collect answer data by referring to a flowchart shown in FIG. 10. As shown in the figure, the flowchart begins with a step S51 at which the reception unit 61 forms a judgment as to whether or not the reception apparatus 2 made an access thereto. The reception unit 61 is in a wait state, forming the judgment repeatedly till the outcome of the judgment indicates that the reception apparatus 2 made an access thereto. As the outcome of the judgment indicates that the reception apparatus 2 made an access thereto, the reception unit 61 receives answer data from the reception apparatus 2. Then, the flow of the processing goes on to a step S52.

At the step S52, the reception unit 61 extracts a question ID from the received answer data. At the next step S53, the reception unit 61 forms a judgment as to whether or not a period to accept an answer associated with the question ID has expired. It should be noted that a deadline of collection of answers is set by the user of the collection apparatus 5 for each question.

If the outcome of the judgment formed at the step S53 indicates that the period to accept an answer associated with the question ID extracted at the step S52 has not expired, the flow of the processing goes on to a step S54. At the step S54, the reception unit 61 stores the answer data in the storage unit 62.

Then, the pieces of processing of the steps S51 to S53 are carried out repeatedly till the outcome of the judgment formed at the step S53 indicates that the period to accept an answer associated with the question ID extracted at the step S52 has expired. As the outcome of the judgment formed at the step S53 indicates that the period to accept an answer associated with the question ID extracted at the step S52 has expired, the flow of the processing goes on to a step S55.

At the step S55, the answer-analyzing unit 63 reads out answer data, the collection period of which has expired, from the storage unit 62, and analyzes the data. In the case of a question of a quiz, for example, the answer data is compared with a correct answer to form a judgment as to whether the answer data is correct. A reception-apparatus ID included in the answer data is stored.

At the next step S56, the answer-analyzing unit 63 stores results of the analysis carried out at the step S55 in the database 64. The analysis results of a question stored in the database 64 are typically transmitted to a broadcasting station employing the broadcasting apparatus 1.

Figure 11:
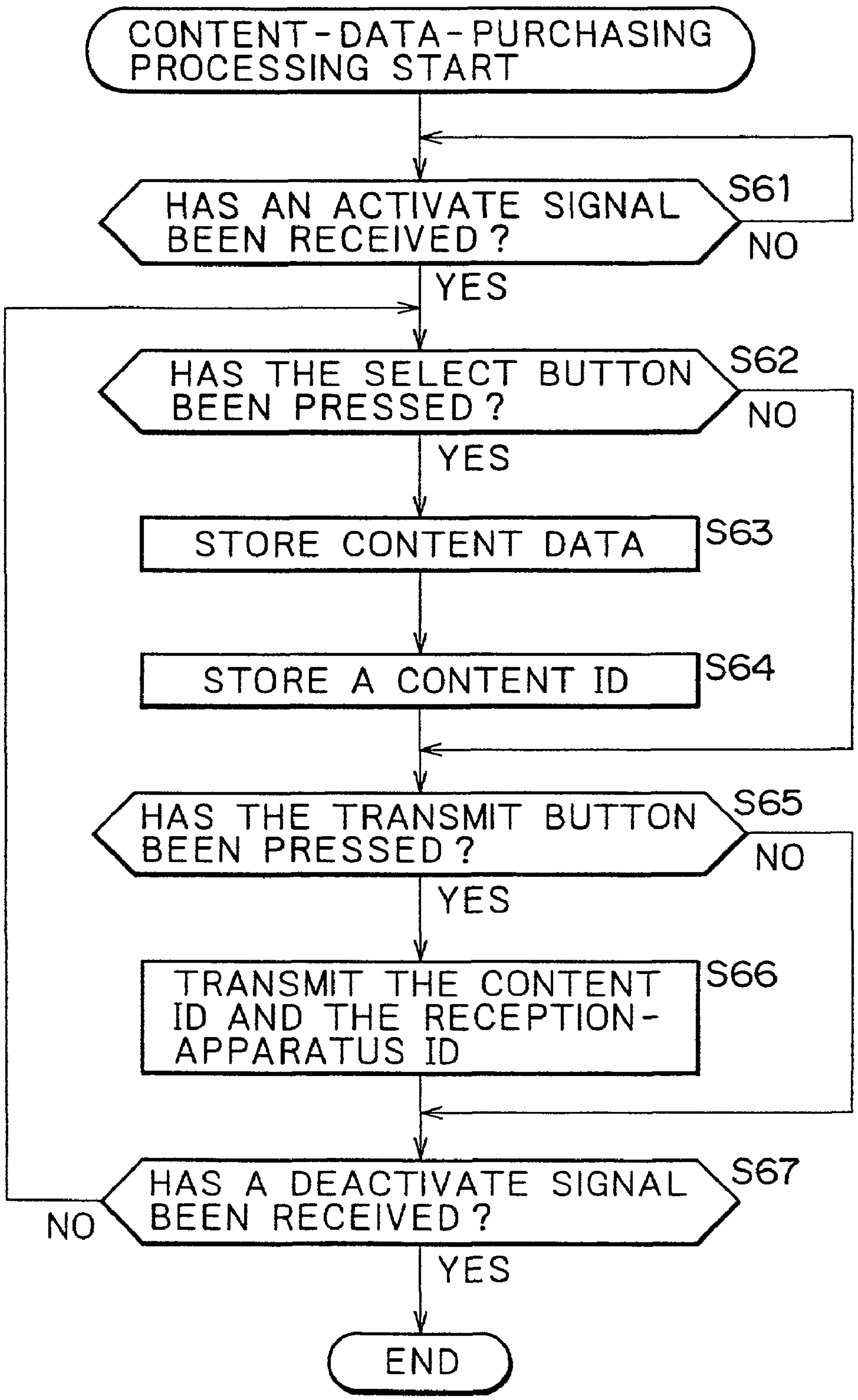
FIG. 11 is a flowchart used for explaining processing carried out by the reception apparatus to purchase content data.

The following description explains processing carried out by the reception apparatus 2 to purchase content data sold by multiplexing the data in a signal broadcasted by the broadcasting apparatus 1 by referring to a flowchart shown in FIG. 11. The processing to purchase content data is started when the control unit 41 detects content data multiplexed in a broadcasted signal in a radio broadcast received by the reception apparatus 2.

The flowchart shown in FIG. 11 begins with a step S61 at which the control unit 41 forms a judgment as to whether or not an activate signal has been received. The formation of the judgment is repeated till the outcome of the judgment indicates that an activate signal has been received. As the outcome of the judgment indicates that an activate signal has been received, the control unit 41 controls the operation input unit 47 so as to detect operations carried out by the user on the select button 32 and the cancel button 33 and also controls the display control unit 48 to turn on the active indicator 31. As a result, the select button 32 and the cancel button 33 are each put effectively in a state of being enabled to generate input signals and the active indicator 31 is turned on.

At the next step S62, the control unit 41 forms a judgment as to whether or not the select button 32 was pressed and the cancel button 33 was not. If the outcome of the judgment indicates that the select button 32 was pressed and the cancel button 33 was not, the purchase processing goes on to a step S63.

At the step S63, the storage unit 49 stores content data separated by the received-signal separation unit 51 in accordance with control executed by the control unit 41. At the next step S64, the storage unit 49 stores the content ID of the recorded content data in accordance with control executed by the control unit 41.

It should be noted that if the outcome of the judgment formed at the step S62 indicates that the select button 32 was not pressed or the cancel button 33 was pressed, on the other hand, the pieces of processing of the steps S63 and S64 are skipped.

At the next step S65, the control unit 41 forms a judgment as to whether or not the transmit button 36 was pressed. If the outcome of the judgment indicates that the transmit button 36 was pressed, the purchasing processing goes on to a step S66. At the step S66, the transmission unit 53 transmits the content ID of content data and the reception-apparatus ID, which are stored in the storage unit 49, to the broadcasting apparatus 1 in accordance with control executed by the control unit 41.

At the next step S67, the control unit 41 forms a judgment as to whether or not a deactivate signal has been received. If the outcome of the judgment indicates that a deactivate signal has not been received, the purchasing processing goes back to the step S62 and the following pieces of processing is repeated. If the outcome of the judgment indicates that a deactivate signal has been received, on the other hand, the control unit 41 controls the operation input unit 47 so as to ignore operations carried out by the user on the select button 32 and the cancel button 33 and also controls the display control unit 48 to turn off the active indicator 31. As a result, the select button 32 and the cancel button 33 are each put effectively in a state of being disabled to generate input signals and the active indicator 31 is turned off.

As described above, if the outcome of the judgment formed at the step S62 indicates that the select button 32 was not pressed or the cancel button 33 was pressed, the pieces of processing of the steps S63 and S64 are skipped. If the outcome of the judgment formed at the step S65 indicates that the transmit button 36 was not pressed, on the other hand, the processing of the step S66 is skipped.

In the processing to purchase content data as described above, encrypted content data is stored in the storage unit 49. In order to make a request for a decryption key for decoding the encrypted content data, it is necessary to transmit the content ID and the reception-apparatus ID to the broadcasting apparatus 1.

The broadcasting apparatus 1 transmits a decryption key indicated by the content ID received from the reception apparatus 2 to the reception apparatus 2 indicated by the reception-apparatus ID also received from the reception'apparatus 2. The processing to transmit a decryption key is explained by referring to a flowchart shown in FIG. 12.

Figure 12:
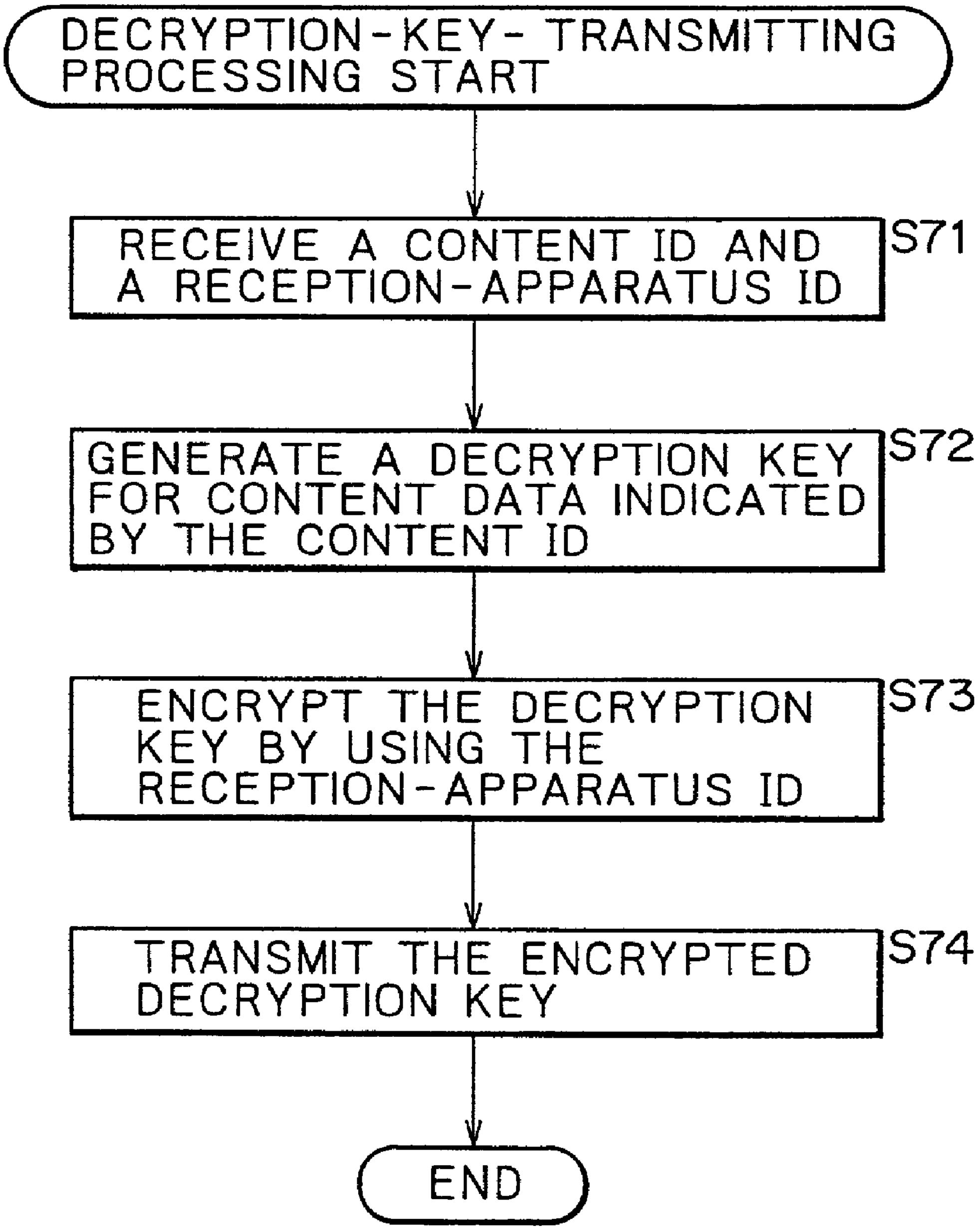
FIG. 12 is a flowchart used for explaining processing carried out by the broadcasting apparatus to transmit a decryption key.

As shown in FIG. 12, the flowchart begins with a step S71 at which a reception unit employed in the broadcasting apparatus 1 receives a content ID and a reception-apparatus ID from the reception apparatus 2 in accordance with control executed by the control unit 11. The reception unit itself is shown in none of the figures. At the next step S72, the transmission unit 24 generates a decryption key of already transmitted encrypted content data indicated by the content ID received at the step S71 in accordance with control executed by the control unit 11.

At the next step S73, the transmission unit 24 encrypts the decryption key generated at the step S72 by using the reception-apparatus ID received at the step S71 in accordance with control executed by the control unit 11. At the next step S74, the transmission unit 24 includes the decryption key encrypted at the step S73 in a broadcast signal and transmits the signal in accordance with control executed by the control unit 11.

The encrypted decryption key included in the broadcast signal is decrypted by the control unit 41 employed in the reception apparatus 2. The decryption key is then supplied to the content & question playback unit 52 for use in decryption of encrypted content data.

It should be noted that, since the encrypted decryption key is encrypted by the reception apparatus 2 by using the reception-apparatus ID known only by the reception apparatus 2, the content data cannot be used illegally.

The broadcasting apparatus 1 identifies the user using the content data from the received reception-apparatus ID and charges the fee for the purchase of the content to the user.

As described above, in accordance with the reception apparatus 2 provided by the present invention, the transmit button 36 is operated for both specifying a transmission of answer data and specifying a purchase of content data. Thus, the number of buttons provided on the reception apparatus 2 can be reduced, the reception apparatus 2 can be made small in size and the operatability of the reception apparatus 2 is improved.

In addition, since familiarization with the operation to transmit an answer to a question leads to familiarization with the operation to purchase content data, it is possible to prevent the user of the reception apparatus 2 from hesitating to purchase content data due to unfamiliarity with the operation of a button.

In this embodiment, a question ID and a content ID are used respectively as information for identifying a question and information for identifying content data as described above. It should be noted, however, that information comprising typically a channel number and a broadcasting time can also be used as information for identifying a question or content data in place of a question ID and a content ID.

Figure 13:
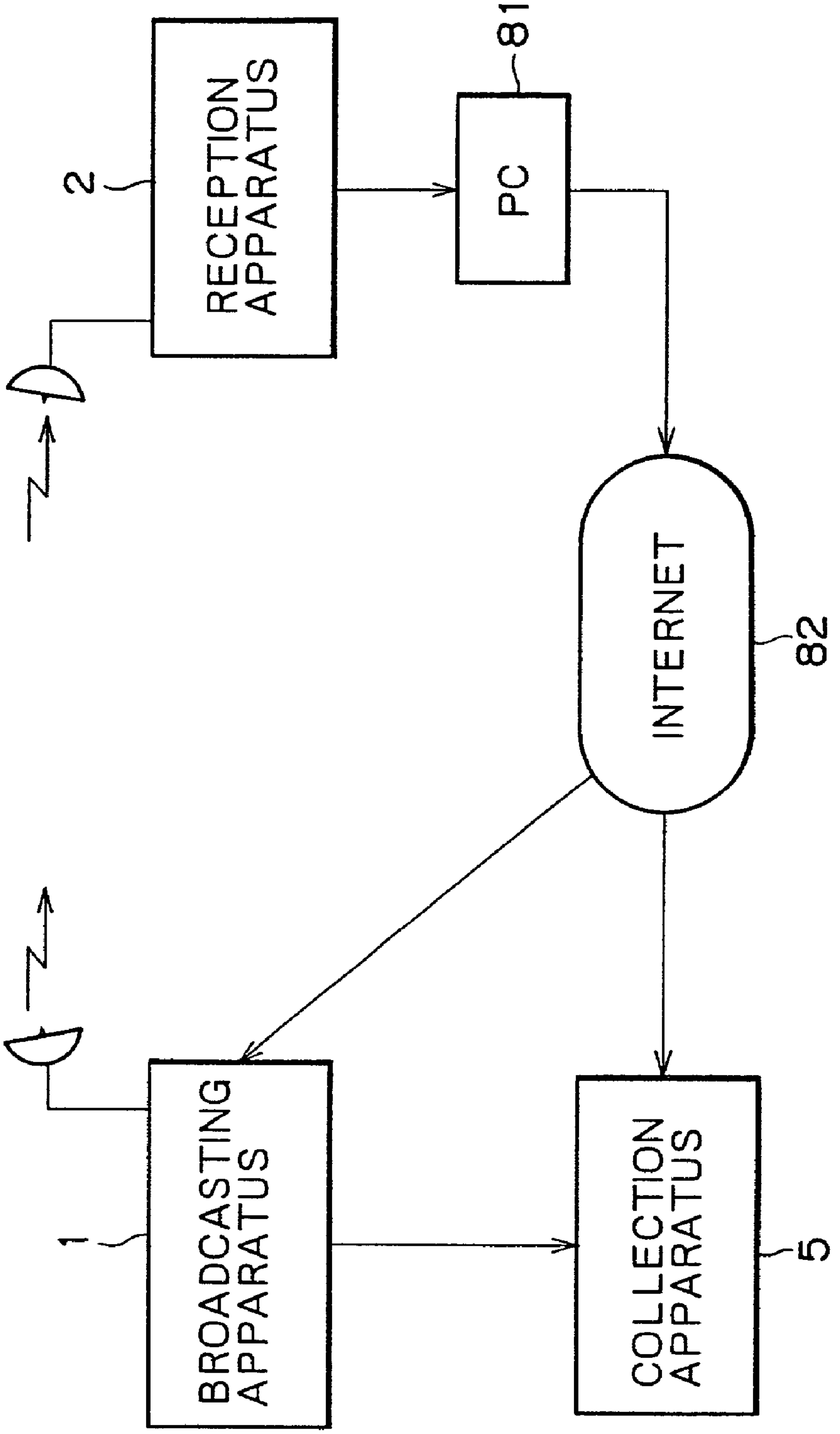
FIG. 13 is a block diagram showing another typical configuration of the broadcasting system provided by the present invention.

When a question's channel number and broadcasting time are used for identifying a question in place of a question ID, it is necessary to transmit generation times of the activate and deactivate signals for the question and the question ID assigned to the question from the broadcasting apparatus 1 to the collection apparatus 5 in advance as shown in FIG. 13. However, answer data transmitted by the reception apparatus 2 in response to the question to the collection apparatus 5 includes a broadcasting time used as a substitute for the question ID. In this case, the collection apparatus 5 compares the broadcasting time received from the reception apparatus 2 with the activate and deactivate signals' generation times received from the broadcasting apparatus 1 to form a judgment as to whether or not the answer data also received from the reception apparatus 2 is associated with the question ID also received from the broadcasting apparatus 1.

FIG. 13 is a diagram showing another typical configuration of the broadcasting system provided by the present invention. In this broadcasting system, the broadcasting apparatus 1 transmits generation times of the activate and deactivate signals for a question and the question ID assigned to the question to the collection apparatus 5 as described above.

As shown in FIG. 13, the reception apparatus 2 is connected to a personal computer (PC) 81 for transmitting data such as an answer to the collection apparatus 5 by way of the Internet 82.

Figure 14:
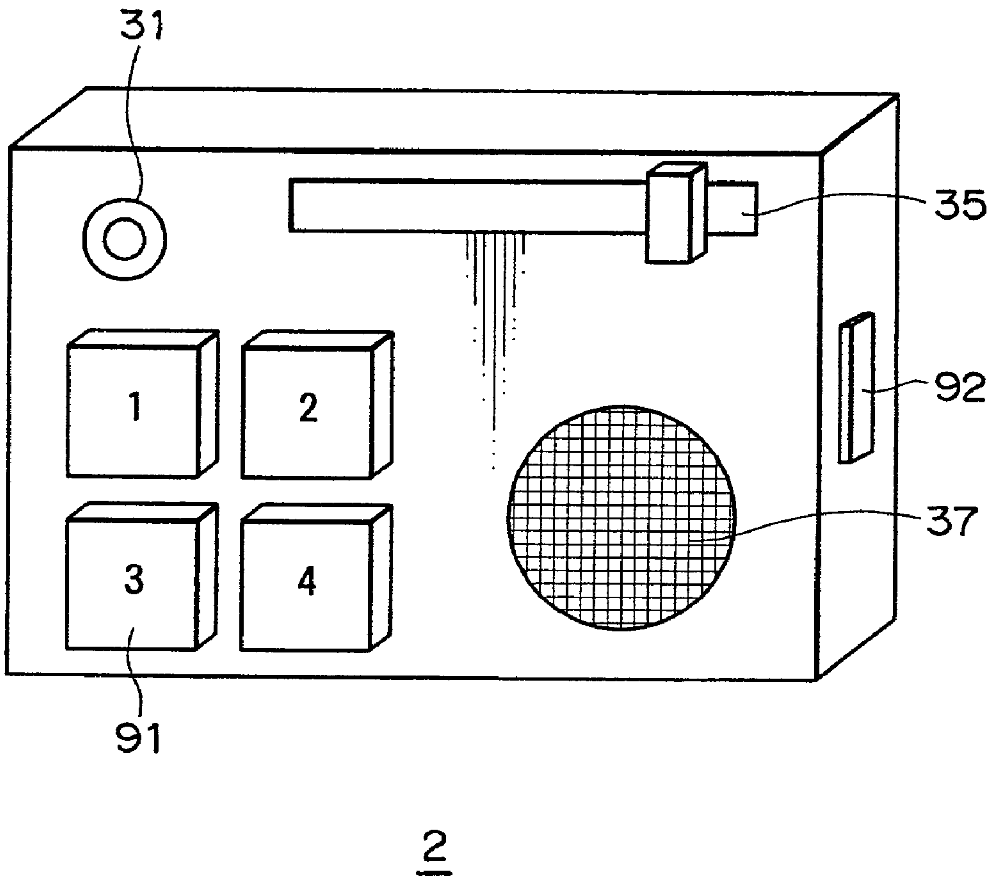
FIG. 14 is a diagram showing an external view of another typical configuration of a reception apparatus employed in the broadcasting system shown in FIG. 13.

FIG. 14 is another typical configuration of the reception apparatus 2. Select buttons 91 are 4 buttons assigned to the numbers 1 to 4 respectively and can be selected by the operator. The select buttons 91 are provided in place of the select button 32 and the cancel button 33 shown in FIG. 3. It should be noted that, by pressing one of the select buttons 91 several times, a value greater than 4 can be entered.

In addition, instead of providing operation means such as the select button 32, the cancel button 33 and the select buttons 91, at the external side surface of the reception apparatus 2, in the typical configurations shown in FIGS. 3 and 14, a variety of inputs can also be entered to the reception apparatus 2 by operating a remote controller.

An external interface (I/F) 92 is connected to the PC 81 and used for exchanging data such as answers with the PC 81. In this case, the antenna 38 employed in the typical configuration shown in FIG. 3 is not required.

The typical configuration shown in FIG. 14 does not include the transmit button 36 employed in the typical configuration shown in FIG. 3. This is because, in the typical configuration shown in FIG. 14, a command to transmit answer data and a command to purchase content data are entered by the user by operating the PC 81 connected to the reception apparatus 2.

In addition, assume for example that an insertable and removable recording medium such as a memory stick is used as the storage unit 49 for storing answer data. In this case, the recording medium serving as the storage unit 49 can be pulled out from the reception apparatus 2 and plugged into a terminal apparatus such as a personal computer installed typically at the user's home, a convenience store, a gasoline station or a station stall and connected to the Internet. In this way, the answer data stored in recording medium can be transmitted to the collection apparatus 5. As an alternative, the recording medium can be inserted into a communication terminal of a device such as a mobile phone so as to allow the answer data stored in the recording medium to be transmitted to the collection apparatus 5.

The embodiment has been explained by taking radio broadcasting as an example. It should be noted, however, the scope of the present invention is not limited to the radio broadcasting. That is to say, the present invention can also be applied to all kinds of broadcasting for transmission of streaming data such as the Internet radio communication and the Internet television communication in addition the television satellite broadcasting and the ground-wave broadcasting.

The series of pieces of processing described above can be carried out by hardware or through execution of software. When execution of software is selected for carrying out the series of pieces of processing, a variety of programs composing the software are executed by a computer incorporated in special hardware. As an alternative, the programs are installed in a recording medium employed in typically a general-purpose personal computer capable of executing the programs to carry out the pieces of processing.

As shown in FIG. 4, a recording medium for presenting a program to the user is distributed separately from the main unit of the apparatus. In order to present a program to the user, however, the use of package media is not mandatory. As mentioned before, examples of the package media are the magnetic disc 43 including a floppy disc, the optical disc 44 including a CD-ROM (Compact-Disc Read-Only Memory) and a DVD (Digital Versatile Disc), the magneto-optical disc 45 including an MD (Mini Disc) and the semiconductor memory 46. As an alternative, a program can also be presented to the user by incorporating the program in the main unit of the apparatus in advance. That is to say, the program is stored in a ROM or a hard disc.

It should be noted that, in this specification, while steps prescribed in a program recorded in a recording medium can of course be executed sequentially along the time axis in an order the steps are prescribed in the program, the steps are not always executed sequentially along the time axis. That is to say, a program may include steps that are executed concurrently or individually.

In addition, the technical term 'system' used in this specification means the whole equipment comprising a plurality of apparatuses.

In accordance with the transmission apparatus and the transmission method, which are provided by the present invention, as well as the program recorded on the recording medium also provided by the present invention, a control signal for limiting an answer-inputting function of a reception apparatus and transmission-destination information showing a transmission destination of an answer entered by a recipient in response to a question are added to a broadcast signal; and the broadcast signal including the control signal and the transmission-destination information is transmitted.

As a result, a quiz and a questionnaire can be broadcasted so that the broadcasted quiz or questionnaire can be responded quickly without requiring the recipient to spend much labor.

In accordance with the reception apparatus and the reception method, which are provided by the present invention, as well as the program recorded on the recording medium also provided by the present invention, a broadcasted signal is received and played back; an answer to a question included in a broadcast obtained as a result of the playback operation is accepted from the user; and the answer accepted in response to the question and information identifying the question are transmitted in accordance with a transmission-destination information included in the broadcasted signal.

As a result, an answer to a broadcasted quiz or questionnaire can be transmitted quickly without requiring the user to spend much labor.

What is claimed is:

1. A reception apparatus used for receiving a broadcasted signal broadcasted from a broadcast station, said apparatus comprising:

reception means for receiving said broadcasted signal, the broadcast signal including a quiz or questionnaire, a control signal and an address of a selected destination apparatus of a plurality of destination apparatuses to which the reception apparatus sends an answer to the quiz or questionnaire, the destination apparatus being different than the broadcast station and being determined in accordance with the quiz or questionnaire included in the broadcast signal;

playback means for playing back said broadcasted signal received by said reception means;

extraction means for extracting the control signal and the address of the selected destination apparatus added to said broadcasted signal received by said reception means separate from a reproduction of the broadcast signal by the reception apparatus;

accepting means for accepting an answer to the quiz or questionnaire included in a broadcast obtained as a result of a playback operation carried out by said playback means;

limitation means for limiting a period of said accepting means to accept an answer to said quiz or questionnaire in accordance with said control signal extracted by said extraction means; and transmission means for transmitting, in response to the accepting means accepting the answer and via the internet using a URL, the URL being the address of the extracted selected destination apparatus, said answer accepted by said accepting means in response to said quiz or questionnaire and information identifying said quiz or questionnaire to the selected destination apparatus, the address of which is included in said broadcasted signal, wherein said transmission means transmits information identifying said reception apparatus to the selected destination apparatus, the address of which is included in said broadcasted signal.

2. A reception apparatus according to claim 1, wherein said transmission means transmits at least one of a broadcasting time and a broadcasting channel as said information identifying said quiz or questionnaire.

3. A reception apparatus according to claim 1, wherein said transmission means transmits quiz or questionnaire identification information added to said broadcasted signal as said information identifying said quiz or questionnaire.

4. A reception apparatus according to claim 1, wherein said accepting means further includes display means for displaying information indicating that a period of said accepting means to accept an answer has not expired.

5. A reception apparatus according to claim 1, wherein said accepting means further includes increment means for incrementing said value of an answer to said quiz or questionnaire and decrement means for decrementing said value of an answer to said quiz or questionnaire.

6. The reception apparatus according to claim 1, wherein the broadcast signal further includes encrypted content multiplexed into the broadcast signal.

7. The reception apparatus according to claim 6, wherein the broadcast signal further includes an encrypted decryption key that enables decryption of the encrypted content.

8. A reception method adopted for receiving a broadcasted signal broadcasted from a broadcast station, said method comprising:

receiving said broadcasted signal, the broadcast signal including a quiz or questionnaire, a control signal and an address of a selected destination apparatus of a plurality of destination apparatuses to which the reception apparatus sends an answer to the quiz or questionnaire, the destination apparatus being different than the broadcast station and being determined in accordance with the quiz or questionnaire included in the broadcast signal;

playing back said broadcasted signal received at said reception step;

extracting the control signal and the address of the selected destination apparatus added to said broadcasted signal received at said reception separate from a reproduction of the broadcast signal by the reception apparatus;

accepting an answer to the quiz or questionnaire included in a broadcast obtained as a result of the playing back;

limiting a period to accept an answer to said quiz or questionnaire at said accepting in accordance with said control signal extracted at said extraction; and transmitting, in response to the accepting an answer and via the internet using a URL, the URL being the address of the extracted selected destination apparatus, said answer accepted at said accepting in response to said quiz or questionnaire and information identifying said quiz or questionnaire to the selected destination apparatus, the address of which is included in said broadcasted signal, wherein said transmission further includes transmitting information identifying said reception apparatus to the selected destination apparatus, the address of which is included in said broadcasted signal.

9. A computer readable recording medium storing computer readable instructions thereon for receiving a broadcasted signal broadcasted from a broadcast station, the computer readable instructions when executed by a computer cause the computer to perform the method comprising:

receiving said broadcasted signal, the broadcast signal including a quiz or questionnaire, a control signal and an address of a selected destination apparatus of a plurality of destination apparatuses to which the reception apparatus sends an answer to the quiz or questionnaire, the destination apparatus being different than the broadcast station and being determined in accordance with the quiz or questionnaire included in the broadcast signal;

playing back said broadcasted signal received at said reception step;

extracting the control signal and the address of the selected destination apparatus added to said broadcasted signal received at said reception separate from a reproduction of the broadcast signal by the reception apparatus;

accepting an answer to the quiz or questionnaire included in a broadcast obtained as a result of the playing back;

limiting a period to accept an answer to said quiz or questionnaire at said accepting in accordance with said control signal extracted at said extraction; and transmitting, in response to the accepting an answer and via the internet using a URL, the URL being the address of the extracted selected destination apparatus, said answer accepted at said accepting in response to said quiz or questionnaire and information identifying said quiz or questionnaire to the selected destination apparatus, the address of which is included in said broadcasted signal, wherein said transmission further includes transmitting information identifying said reception apparatus to the selected destination apparatus, the address of which is included in said broadcasted signal.

10. A reception apparatus used for receiving a broadcasted signal broadcasted from a broadcast station, said apparatus comprising:

reception unit configured to receive said broadcasted signal, the broadcast signal including a quiz or questionnaire, a control signal and an address of a selected destination apparatus of a plurality of destination apparatuses to which the reception apparatus sends an answer to the quiz or questionnaire, the destination apparatus being different than the broadcast station and being determined in accordance with the quiz or questionnaire included in the broadcast signal;

playback unit configured to play back said broadcasted signal received by said reception unit;

extraction unit configured to extract the control signal and the address of the selected destination apparatus added to said broadcasted signal received by said reception unit separate from a reproduction of the broadcast signal by the reception apparatus;

accepting unit configured to accept an answer to the quiz or questionnaire included in a broadcast obtained as a result of a playback operation carried out by said playback unit;

limitation unit configured to limit a period of said accepting unit to accept an answer to said quiz or questionnaire in accordance with said control signal extracted by said extraction unit; and transmission unit configured to transmit, in response to the accepting an answer and via the internet using a URL, the URL being the address of the extracted selected destination apparatus, said answer accepted by said accepting unit in response to said quiz or questionnaire and information identifying said quiz or questionnaire to the selected destination apparatus, the address of which is included in said broadcasted signal, wherein said transmission unit is configured to transmit information identifying said reception apparatus to the selected destination apparatus, the address of which is included in said broadcasted signal.

* * * * *